(12) United States Patent
Jahnle et al.

(10) Patent No.: US 11,260,587 B2
(45) Date of Patent: Mar. 1, 2022

(54) 3D PRINTHEAD COMPRISING ADDITIONAL TEMPERATURE CONTROL MEANS

(71) Applicant: Robert Bosch GmbH, Stuttgart (DE)

(72) Inventors: Hendrik Jahnle, Leutenbach (DE); Norman Lung, Weinstadt (DE); Victor Roman, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 285 days.

(21) Appl. No.: 16/461,709

(22) PCT Filed: Oct. 30, 2017

(86) PCT No.: PCT/EP2017/077776
§ 371 (c)(1),
(2) Date: Oct. 17, 2019

(87) PCT Pub. No.: WO2018/091259
PCT Pub. Date: May 24, 2018

(65) Prior Publication Data
US 2020/0039146 A1    Feb. 6, 2020

(30) Foreign Application Priority Data

Nov. 16, 2016  (DE) .................. 10 2016 222 566.9

(51) Int. Cl.
*B29C 64/209* (2017.01)
*B29C 64/329* (2017.01)
(Continued)

(52) U.S. Cl.
CPC .......... *B29C 64/209* (2017.08); *B29C 64/329* (2017.08); *B33Y 30/00* (2014.12); *B33Y 40/00* (2014.12); *B33Y 80/00* (2014.12)

(58) Field of Classification Search
CPC ... B29C 64/209; B29C 64/329; B29C 64/106; B29C 64/118; B29C 45/2737; B29C 45/27; B29C 45/2701; B33Y 30/00; B33Y 40/00
See application file for complete search history.

(56) References Cited

U.S. PATENT DOCUMENTS

| 3,310,836 A | 3/1967 | Nichols |
| 5,649,277 A | 7/1997 | Greul et al. |

(Continued)

FOREIGN PATENT DOCUMENTS

| CN | 103476569 A | 12/2013 |
| CN | 104162992 A | 11/2014 |

(Continued)

OTHER PUBLICATIONS

English translation for CN104162992 (Year: 2014).*

(Continued)

*Primary Examiner* — Joseph S Del Sole
*Assistant Examiner* — Mohamed K Ahmed Ali
(74) *Attorney, Agent, or Firm* — Michael Best & Friedrich LLP

(57) ABSTRACT

Printhead (10) for a 3D printer, comprising an operational volume (17) for holding feedstock (20), the viscosity of which can change, the operational volume (17) being variable by moving a plunger (31, 31a, 31b) and being provided with an outlet (16) through which the feedstock (20) can be extruded by moving the plunger (31, 31a, 31b), the plunger (31, 31a, 31b) being equipped with temperature control means (36).

13 Claims, 2 Drawing Sheets

(51) Int. Cl.
  *B33Y 30/00* (2015.01)
  *B33Y 40/00* (2020.01)
  *B33Y 80/00* (2015.01)

(56) References Cited

U.S. PATENT DOCUMENTS

| | | | |
|---|---|---|---|
| 2014/0110320 A1* | 4/2014 | Thomas | A23P 30/20 210/137 |
| 2016/0082627 A1 | 3/2016 | Kilim et al. | |
| 2016/0200024 A1* | 7/2016 | Kim | G05B 19/188 425/143 |

FOREIGN PATENT DOCUMENTS

| | | |
|---|---|---|
| DE | 19824129 C2 | 7/2000 |
| DE | 102013114086 | 6/2015 |
| DE | 202015006748 | 11/2015 |
| DE | 102015002967 | 10/2016 |
| JP | 2015168135 A * | 9/2015 |
| WO | 9002034 | 3/1990 |

OTHER PUBLICATIONS

International Search Report for Application No. PCT/EP2017/077776 dated Feb. 9, 2018 (English Translation, 2 pages).

* cited by examiner

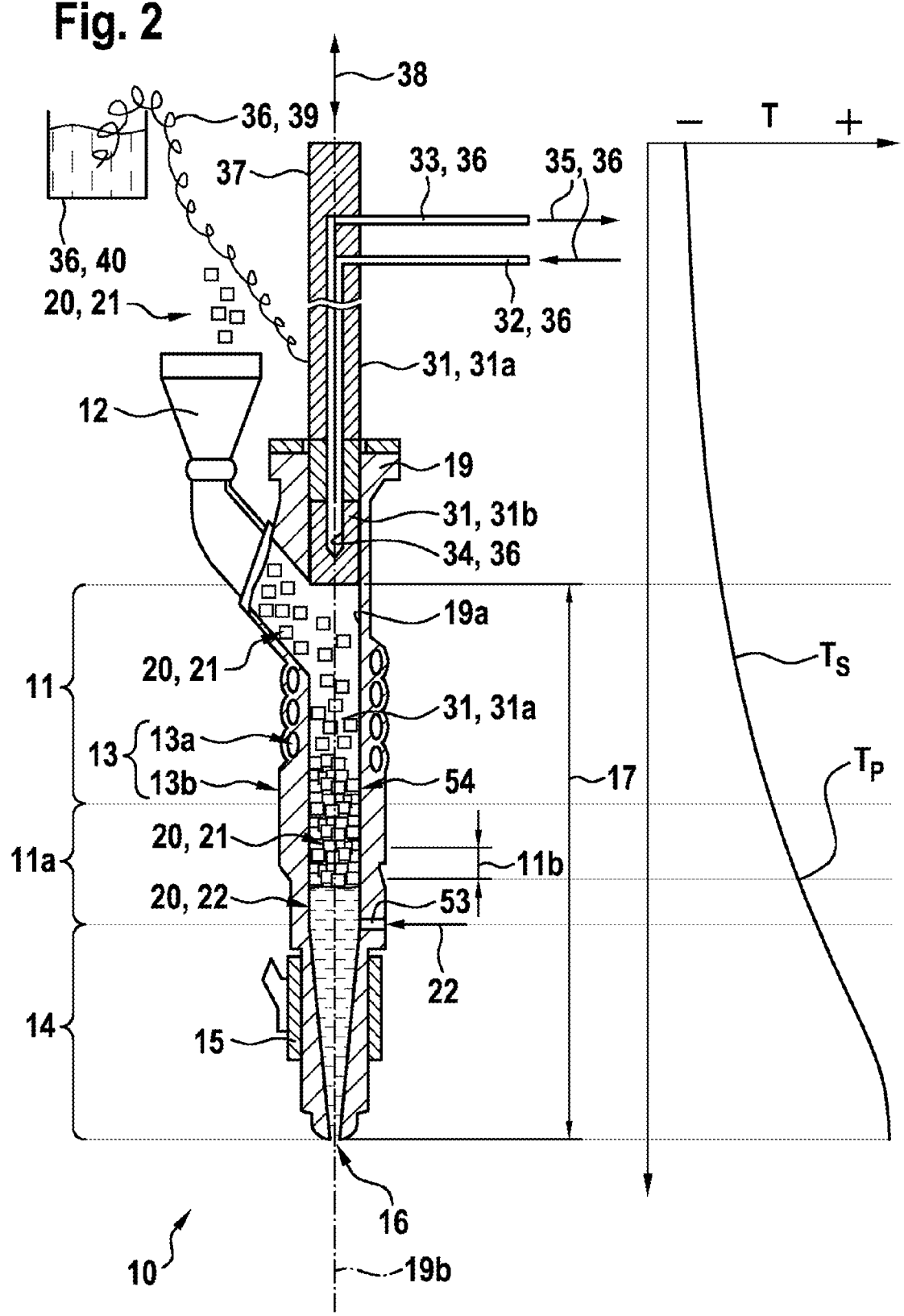

3D PRINTHEAD COMPRISING ADDITIONAL TEMPERATURE CONTROL MEANS

BACKGROUND OF THE INVENTION

The present invention relates to a printhead for 3D printers for the selective local delivery of the liquid phase of a feedstock.

A 3D printer for a material, the viscosity of which can change, receives a solid phase of this material as the feedstock, produces a liquid phase therefrom, and selectively applies this liquid phase at the points belonging to the object being produced. A 3D printer of this kind comprises a printhead in which the feedstock is prepared ready for printing. Furthermore, means for producing a relative movement between the printhead and the working surface on which the object is to be created are provided. In this case, either only the printhead, only the working surface or, however, both the printhead and the working surface can be moved.

The feedstock is typically heated in order to convert it into the liquid phase. US 2016/082 627 A1 discloses feeding of the feedstock in granulate form and conveying it using a screw conveyor to a heated zone from which it emerges in plasticized form.

According to DE 20 2015 006 748 U1, there is a general conflict of goals in this case, in that the feedstock should not already be melting at the point where it is fed in the solid phase.

DE 10 2015 002 967 A1 therefore proposes that the feedstock should only be heated by radiation heating or another locally effective heating at the last moment after it leaves the printhead or even when it encounters the object being produced.

SUMMARY OF THE INVENTION

Within the framework of the invention, a printhead has been developed for a 3D printer. This printhead comprises an operational volume for holding a feedstock, the viscosity of which can change. The operational volume can be changed, i.e. made larger or smaller, by moving a plunger. Furthermore, the operational volume has an outlet through which a liquid phase of the feedstock can be extruded by moving the plunger.

According to the invention, the plunger has temperature-control means which can be used for controlling the temperature of the plunger itself and/or that of the feedstock.

It has been recognized that there is both an upper limit and also a lower limit for the temperature of the plunger. The plunger therefore has to be kept within a prescribed temperature corridor by means of cooling, for example. The upper limit for the temperature of the plunger is where, for example, feedstock which is in contact with the plunger undesirably melts or the printhead overheats in some other manner. On the other hand, the plunger should also not become so cold that condensation forms on it. Condensation can interrupt the print process. If condensation reaches a melt of the feedstock, it can furthermore evaporate there and lead to an uncontrolled, explosion-like extrusion of feedstock. The temperature of the plunger is crucial to observing both limits. A temperature control which acts exclusively from outside the operational volume through the wall thereof only has an indirect effect on the temperature of the plunger. The temperature-control means arranged on the plunger directly influence the temperature of the plunger and thereby guarantee closer adherence to the aforementioned temperature corridor.

Overheating of the printhead may cause damage to the drive source of the plunger, for example. If this drive source is a hydraulic cylinder, for example, heat from the plunger can be introduced into the hydraulic oil of the drive source via the plunger rod with which the plunger is coupled to the drive source. In this way, the hydraulic oil and/or the lubricating greases used may be damaged, which in the worst case scenario has a detrimental effect on the print quality or even causes a fault in the 3D printer.

In this context it is relevant that the heat input from the feedstock to the plunger is not constant during the print process, but fluctuates greatly. If the plunger is displaced toward the outlet and pressure is exerted on the feedstock, the heat input in the plunger is at its maximum. On the other hand, if the plunger is withdrawn and loses contact with the feedstock, the heat input in the plunger is minimal. There is therefore a constant need for intervention during the print process, in order to control the temperature of the plunger.

In a particularly advantageous embodiment of the invention, the plunger has at least one channel for conducting a temperature-control medium. By means of the temperature-control medium, heat can then be transported in the desired direction, for example from the plunger toward a heat sink or also—for heating the feedstock—from a heat source toward the plunger. The temperature-control medium may, for example, be water, a thermal oil, compressed air, heating gas or also a cryogenic liquefied gas such as liquid nitrogen, for example. The plunger may therefore be used for pre-heating, for example, or also as the sole heating of the feedstock, which is particularly advantageous when the feedstock is a material with a high melting point and/or when a high mass flow of feedstock is conveyed in the interests of a high printing speed. If the feedstock has a low melting point, the temperature control of the plunger can be used to keep the temperature of the feedstock deliberately below this melting point. This is counterintuitive compared with solutions from the prior art which are only able to increase the temperature.

In a particularly advantageous embodiment of the invention, the plunger is divided into a print part facing the feedstock and a temperature-control part facing away from the feedstock and in thermal contact with the print part. In this way, the two parts can each be optimized for their specific function.

For example, at least a portion of the channel may run through the temperature-control part. The temperature-control part can then be produced from a material which is particularly ideally suited to being processed in this form. The temperature-control part may, in particular, be produced using a technique which is particularly well suited to the production of complex and at the same time delicate structures. Additive manufacturing, for example, and in this case 3D printing in particular, is suitable for the production of media-tight three-dimensional structures.

It is advantageous for the print part to be produced from a harder material than the temperature-control part. The print part is subject to greater mechanical wear, as it seals the operational volume to prevent the feedstock from escaping and can therefore rub against the inner wall of the operational volume. For example, the print part may be made of hardenable or hardened steel. The temperature-control part may be made of aluminum, for example, which is favorable and comparatively easy to work and at the same time has good thermal conductivity. When combined, the print part and the temperature-control part then create a favorable and highly effective composite part.

The temperature-control part and the print part may, in particular, exhibit portions of a channel for the temperature-control medium which correspond to one another. For example, the channel for the forward flow and the channel for the return flow of the temperature-control medium may run through the temperature-control part and both channels may open out together in an opening in the print part. The opening is comparatively easy to produce. The temperature-control medium exchanges heat with the print part at its inner wall before it is conducted through the return flow back out of the plunger.

As an alternative or also in combination with a channel for conducting a temperature-control medium, the plunger may also be coupled by heat conduction to a heat reservoir, for example via a rod or strand made of a metal such as copper with good heat-conducting properties. In this way, the heat can be transported without the risk of leaks and without movable parts, the cost being that the speed of the heat transportation cannot be increased by increasing the flow speed of the temperature-control medium.

In the simplest case, a cooling plate or cooling body can be coupled to the ambient air as a heat reservoir, for example.

In a further particularly advantageous embodiment of the invention, the operational volume has an intake zone with a feed for the feedstock and also a heatable plastification zone. In this case, the plunger can be introduced into the intake zone.

In this arrangement, a feedstock in granulate form, for example, can trickle in a cyclical manner from the feed into the operational volume when the plunger is drawn back behind the region of the feed. If the plunger is then moved in the direction of the outlet, the feedstock is compressed and conveyed into the plastification zone. This process relies on the fact that feedstock which is in contact with the plunger is not melted. The plasticized phase of the feedstock has a tough, sticky consistency with a great tendency for surface adhesion. If the plunger comes into contact with this phase it can stick to it, causing the subsequent trickling of fresh feedstock to be hindered or even entirely prevented when the plunger is drawn back.

The temperature-control means are therefore advantageously configured to keep the temperature $T_S$ of the input zone below the temperature $T_P$ from which the feedstock is plasticized, even when the liquid phase of the feedstock leaves the outlet. If there is only cooling of the plunger via cooling means arranged outside the operational volume, this cannot always be guaranteed, particularly when there are high melting temperatures and/or during long print jobs of 12 hours and more. For example, the plastic PES has a melting temperature of over 320° C.

A cooling system of the input zone arranged outside the operational volume is nevertheless advantageous in supporting cooling by the plunger. It is also possible for cooling of this kind to be combined with temperature control by the plunger which is designed solely for heating the plunger.

For example, this kind of temperature control can be deactivated when the plunger is drawn back behind the input zone and it can be reactivated when fresh feedstock is conveyed toward the plastification zone. The temperature control acting directly on the plunger reacts sufficiently quickly to the deactivation or reactivation request.

Embodiments of the printhead which manage without an input zone for the feed of a solid phase of the feedstock are also appropriate. For example, the operational volume may have a feed for the liquid phase of the feedstock from which feedstock always flows into the operational volume, for example, when the plunger has been drawn back behind the feed.

In a further particularly advantageous embodiment of the invention, the plunger is connected via a thermally insulating connection piece to its drive source. In this way, an unwanted heat input into a heat-sensitive drive source, such as a hydraulic cylinder or a piezoelectric drive source, for example, is advantageously reduced.

In a particularly advantageous embodiment of the invention, the drive source for the plunger is configured to generate a pressure p of 1000 bar or more, preferably of 1500 bar or more, in the feedstock. In this way, the liquid phase of a highly viscous feedstock can also be forced through substantially smaller outlets, so that the resolution of delicate printed structures can be substantially improved.

Alternatively, it is advantageous for the drive source for the plunger to be designed to produce a pressure p of between 350 bar and 750 bar in the feedstock. In this pressure range, a sufficiently large range of plastics can be processed as feedstocks with comparatively moderate expenditure on equipment.

In the case of 3D printing with a filament as the feedstock, the pressure which drives the liquid material from the outlet of the printhead is produced by the forward feed of the filament. The maximum pressure that can be reached is therefore comparatively low on account of this principle. It is in the order of 60-70 bar. At higher pressures, molten material flows in a backward direction on past the filament and therefore emerges from the printhead at the wrong point. This means that nozzle diameters, and therefore lateral structural resolutions, starting from approximately 0.4 mm can currently be used on a commercial scale. The subject matter of the research is currently that of improving this threshold to values of 0.2 mm or under. Many plastics can also not be processed at all, or only with unattractive nozzle diameters, because they are too viscous for the available pressure, even in the liquid state. The accuracy of the printed structures lies within the same order of magnitude.

On the other hand, if the use of the plunger means there is a substantially higher pressure available, nozzle diameters of around 0.1 mm can be used and structures can be printed to a precision of up to approximately ±50 µm. Furthermore, any thermoplastic materials can be used in principle, and also certain thermosetting resins and elastomers. Low-melting solders such as tin, for example, or materials with fillers of any kind can also be used. Where appropriate, different nozzle diameters are necessary when using these materials. The printhead operates with each nozzle diameter, since the conveyance of the feedstock using the plunger is randomly scalable. The scaling need only be adapted to the specific material.

The drive source for the plunger may be an electric motor with a mechanical transmission, for example, such as through a mechanical spindle. With a translation of this kind, a force and therefore pressure increase is accompanied by a path extension, so that the pressure build-up lasts correspondingly longer and the printhead is made heavier by the lower force density. Alternatively, the drive source may be a hydraulic pressure source and, in this case, particularly a servo-hydraulic pressure source. In this case, the translation takes place via area ratios of active surfaces.

Further measures improving the invention are presented in greater detail below along with the description of the preferred exemplary examples of the invention with the help of the figures.

In a further particularly advantageous embodiment of the invention, a path measuring system for the position s of the plunger and/or a sensor for the force F exerted by the plunger on the granulate or for a hydraulic pressure $p_H$ exerted on the plunger is provided. The forward feed of the plunger is a measure of the quantity Q of feedstock that emerges from the outlet. This quantity can be checked via the path-measuring system. Furthermore, the force F correlates directly with the pressure in the feedstock.

In a further particularly advantageous embodiment of the invention, an active controller for the drive source of the plunger is provided in the printhead, and/or in the 3D printer containing the printhead, which is designed to regulate the force F exerted by the plunger on the granulate to a predefined target value $F_S$. In this way, the pressure in the feedstock can be kept at a predefined value. In particular, in this way it can be automatically balanced when ambient air escapes from the delivery of granulate and this delivery is thereby compacted. The forward movement of the plunger may, in particular, be regulated by a process controller in a path and force-dependent manner in the µm range.

In a further particularly advantageous embodiment of the invention, a pressure sensor for the pressure $p_L$ and/or a temperature sensor for the temperature $T_L$ of the liquid phase of the feedstock is arranged in the region of the outlet. The pressure $p_L$ is the primary parameter which decides the mass flow Q of feedstock from the outlet. An additional measurement of the temperature $T_L$ enables the temperature dependence of the viscosity of the feedstock to be taken into consideration too when determining the mass flow Q. Through the forward movement of the plunger, the quantity Q to be dosed can be precisely controlled. For the quality of the object produced, control of the temperature $T_L$, in particular in the form of a constant and precise control, is even more important, in order to avoid thermal degradation of the feedstock. To this extent, the pressure sensor, for example, can be dispensed with in a favorable variant of the printhead.

In a further particularly advantageous embodiment of the invention, an evaluation unit is provided which is designed to evaluate from the pressure $p_L$ and/or the temperature $T_L$ an increase in volume ΔV+ of the liquid phase of the feedstock during relaxation through the outlet. The inventors have recognized that exactly how much material leaves the outlet is not crucial to the accuracy of the structures applied to the object being produced. Instead, what is crucial is what reaches the object being produced. Since the invention allows the feedstock to be forced through small outlets at substantially higher pressures than has hitherto been possible according to the prior art, the increase in volume ΔV+ due to the relaxation of these high pressures leads to a relevant effect for the structure size actually produced. For example, when initiated by the evaluation unit, the plunger feed can be reduced by an amount corresponding to the volume increase ΔV+. In this way, a strand of feedstock which has a diameter of 100 µm±5 µm can be deposited on the object being manufactured, for example.

In a further advantageous embodiment of the invention, the evaluation unit is in addition designed to evaluate from the temperature $T_L$ a volume reduction ΔV_ in the liquid phase of the feedstock during solidification after emerging from the outlet. Hence, for example, a strand of feedstock can be deposited on the object, which strand initially has a diameter of 105 µm and shrinks during solidification to exactly the desired diameter of 100 µm.

In a further particularly advantageous embodiment of the invention, the evaluation unit is in addition configured to evaluate the energy flow E which is transported by the liquid phase of the feedstock passing through the outlet. In this way, the heat balance in the object being produced can be monitored overall, so that further print strategies and path movements of the printhead can be adjusted. For example, when manufacturing an extended object it may be necessary for the print action to be interrupted at one position and resumed at another position after the printhead has been moved. If the energy flow E is evaluated, it can be recognized, for example, that the position at which the print action is to be resumed has been moved due to thermal effects and this has to be reacted to accordingly. In this case, the outward energy flow from the object through the heat conduction and/or heat radiation may, in particular, also be taken into account.

In a further particularly advantageous embodiment of the invention, the evaluation unit is, in addition, configured to evaluate the mass flow Q of the feedstock passing through the outlet, taking account of the position s of the plunger, and/or the force F exerted by the plunger. In this way, the accuracy of the dosage and, in particular, the structure sizes produced on the object can be improved still further.

So that the sizes measured by the sensors or evaluated by the evaluation unit ultimately result in a more accurate production of structures of the object being produced, these sizes may, in particular, be fed back into an active process control.

Through a qualification and characterization of materials on the printhead, a set of parameters can be produced where appropriate which enables structures to be produced with a high degree of accuracy, also controlled purely, i.e. without active feedback.

The geometries, temperatures and other values described are randomly scalable to different materials and groups of materials.

Further measures improving the invention are depicted in greater detail below along with the description of the preferred exemplary embodiments of the invention.

BRIEF DESCRIPTION OF THE DRAWINGS

In the Figures:

FIG. 2 shows a further view at a given time of the printhead 10 in the non-printing state.

DETAILED DESCRIPTION

Figure 1:
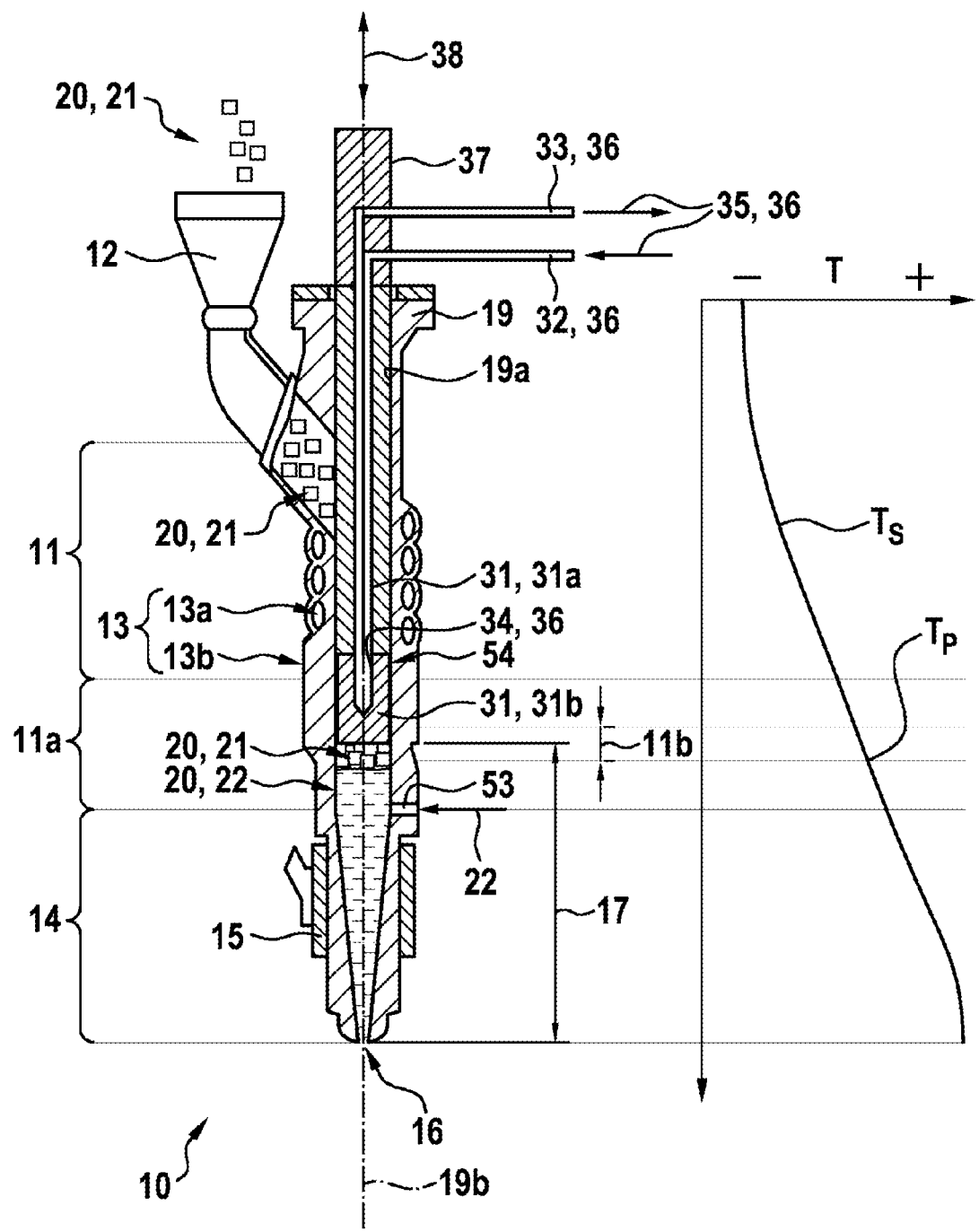
FIG. 1 shows an exemplary embodiment of the printhead 10 according to the invention in the printing state.

According to FIG. 1, the printhead 10 comprises a housing 19 with a plunger 31 guided therein. The plunger 31 comprises a temperature-control part 31a and a print part 31b. The print part 31b made of hardened steel is guided in a sealing manner relative to the feedstock in the central bore 19a of the housing 19. It makes it difficult for the solid phase 21 of the feedstock 20 to escape and presses this solid phase 21 from the input zone 11 into the compression zone 11a, where a boundary layer 11b to the liquid phase 22 of the feedstock 20 is created. In this case, a ventilation gap 54 via which gases can escape from the housing 19 remains. The temperature-control part 31a made of aluminum abuts the print part 31b and is guided more loosely in the central bore 19a of the housing 19. Consequently, the temperature-control part 31a is subject to less mechanical wear than the print part 31b. The plunger 31 is connected to its drive source 38, which is not further depicted in detail in FIG. 1, via a heat-insulating connection piece 37. When moving the plunger 31 toward the outlet 16 of the printhead 10, the liquid phase 22 of the feedstock 20 is ejected from the outlet 16. FIG. 1 is a view at a given time in the state in which precisely this is possible with the printhead 10 ready for printing. In this state, the operational volume 17 within the central bore 19a in the housing 19 of the printhead 10 is comparatively small.

A forward feed channel 32 and a return feed channel 33 for a temperature-control medium 35 are conducted through the temperature-control part 31a. The forward feed channel 32 and the return feed channel 33 open into a central bore 34 in the print part 31b. This central bore 34 therefore closes the circuit for the temperature-control medium 35 and along with the forward feed channel 32, the return feed channel 33 and the temperature-control medium 35 creates the temperature-control means 36 for the plunger 31. In the central bore 34 the temperature-control medium 35 exchanges heat with the print part 31b and therefore with the solid phase 21 of the feedstock 22.

In the exemplary embodiment shown in FIG. 1, the solid phase 21 of the feedstock 20 is fed via a funnel 12 and trickles into an input zone 11 in the printhead 10 as soon as the plunger 31 is drawn back behind this input zone 11. So that this subsequent trickling is possible, only the solid phase 21 of the feedstock may be present in the input zone 11. In particular, this solid phase 21 may not melt and adhere. The input zone 11 is therefore cooled from the outside via cooling means 13. The cooling means 13 comprise an active cooling system 13a with a cooling medium and a passive cooling system 13b with cooling fins. In addition, the temperature-control medium 35 for the plunger 31 is likewise a cooling medium and therefore helps the temperature $T_S$ in the input zone to remain below the temperature $T_P$ from which the solid phase 21 of the feedstock 20 plasticizes.

The solid phase 21 of the feedstock 20 is heated in the plastification zone 14 by means of a heating unit 15 and thereby converted into the liquid phase 22 which can escape from the outlet 16 when exposed to pressure.

The profile of the temperature T along the axis 19b of the housing 19 is drawn on the right in FIG. 1.

In addition, FIG. 1 shows an additional inlet 53 on the housing 19 in which the liquid phase 22 of the feedstock 20 can be directly introduced into the plastification zone 14 in a further embodiment.

FIG. 2 shows a further view at a given time of the printhead 10 in the non-printing state, in which the plunger 31 has been drawn back behind the input zone 11. This opens the way to the solid phase 21 of the feedstock 20 to trickle into the input zone 11 subsequently. At the same time, when the plunger 31 is drawn back, thermal contact with the solid phase 21 of the feedstock 20, and therefore also the heat input in the plunger 31, is suddenly interrupted. The temperature control of the plunger 31 can be quickly adapted, deactivated or even returned to heating, in order to prevent the formation of condensation on the plunger 31. In the state shown in FIG. 2, the working volume 17 within the central bore 19a in the housing 19 of the printhead 10 is at a maximum.

FIG. 2 also shows by way of example how the plunger 31 can be coupled to a heat reservoir 40 via a heat-conducting strand 39. The strand 39 and the heat reservoir 40 are then also included as temperature-control means 36 for the plunger 31.

What is claimed is:

1. A printhead (10) for a 3D printer, the printhead comprising an operational volume (17) for holding a feedstock (20), the feedstock (20) having a viscosity of which can change, and the printhead comprising a plunger, wherein the operational volume (17) can be changed by moving the plunger (31, 31a, 31b), and wherein the operational volume has an outlet (16) through which a liquid phase (22) of the feedstock (20) can be extruded by moving the plunger (31, 31a, 31b), characterized in that the plunger (31, 31a, 31b) has temperature-control means (36) in the form of at least one channel (32, 33) configured to conduct a temperature-control medium (35).

2. The printhead (10) as claimed in claim 1, characterized in that the plunger (31) is divided into a print part (31b) facing the feedstock (20, 21) and a temperature-control part (31a) facing away from the feedstock (20, 21) and in thermal contact with the print part (31b).

3. The printhead (10) as claimed in claim 2, characterized in that at least a portion of the at least one channel (32, 33) runs through the temperature-control part (31a).

4. The printhead (10) as claimed in claim 2, characterized in that the print part (31b) is produced from a harder material than the temperature-control part (31a).

5. The printhead (10) as claimed in claim 1, characterized in that the plunger (31, 31a, 31b) is coupled by heat conduction (39) to a heat reservoir (40).

6. The printhead (10) as claimed in claim 1, characterized in that the operational volume (17) has an intake zone (11) with a feed (12) for the feedstock (20, 21) and also a heatable (15) plastification zone (14), wherein the plunger (31, 31a, 31b) is configured to be introduced into the intake zone (11).

7. The printhead (10) as claimed in claim 6, characterized in that the temperature-control means (36) are configured to keep a temperature ($T_S$) of the input zone (11) below a temperature ($T_P$) from which the feedstock (20) is plasticized, even when the liquid phase (22) of the feedstock (20) leaves the outlet (16).

8. The printhead (10) as claimed in claim 7, further comprising a cooling system (13) of the intake zone (11) arranged outside the operational volume (17).

9. The printhead (10) as claimed in claim 1, characterized in that the plunger (31, 31a, 31b) is connected via a thermally insulating connection piece (37) to a drive source (38).

10. The printhead (10) as claimed in claim 1, characterized in that the at least one channel (32, 33) extends through the plunger (31, 31a, 31b).

11. The printhead (10) as claimed in claim 10, characterized in that the at least one channel (32, 33) opens into a central bore (34) of the plunger (31, 31a, 31b).

12. The printhead (10) as claimed in claim 10, characterized in that the at least one channel (32, 33) extends centrally and longitudinally through the plunger (31, 31a, 31b).

13. The printhead (10) as claimed in claim 2, characterized in that the at least one channel (32, 33) opens into a central bore (34) of the print part (31b) of the plunger (31).

* * * * *